April 25, 1961 H. G. SCAMMON 2,980,932
LOADER FOR COUNTER MOLDING APPARATUS
Filed Jan. 26, 1959 3 Sheets-Sheet 1
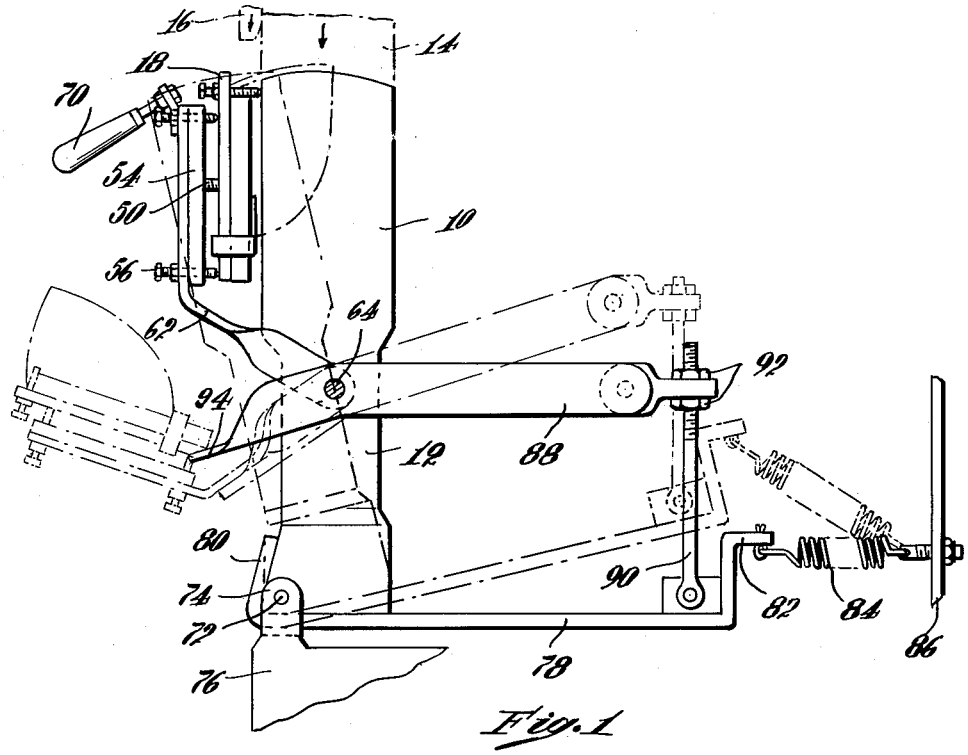
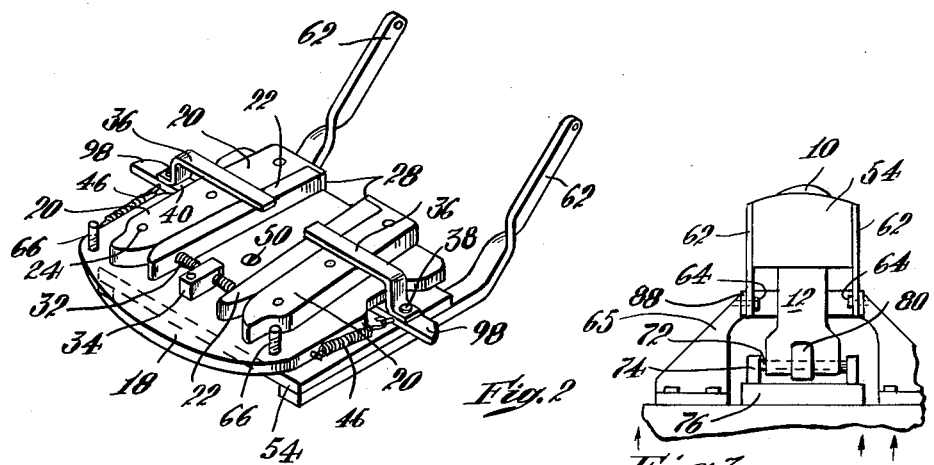
INVENTOR.
Henry G. Scammon
BY
Roberts, Cushman & Grover
ATT'YS April 25, 1961 H. G. SCAMMON 2,980,932
LOADER FOR COUNTER MOLDING APPARATUS
Filed Jan. 26, 1959 3 Sheets-Sheet 2

INVENTOR.
Henry G. Scammon
BY
Roberts, Cushman & Grover
ATT'YS

INVENTOR
Henry G. Scammon

United States Patent Office 2,980,932
Patented Apr. 25, 1961

2,980,932

LOADER FOR COUNTER MOLDING APPARATUS

Henry G. Scammon, % Gould & Scammon, Inc., 207 Court St., Auburn, Maine

Filed Jan. 26, 1959, Ser. No. 789,085

10 Claims. (Cl. 12—66)

This invention relates to molding apparatus for shaping flat counter blanks so that they may be assembled with uppers preparatory to lasting and more especially to a loading device for presenting the counter blanks to the male and female mold parts for such shaping.

The principal objects of the invention are to provide in combination with molding apparatus an improved loading device, by means of which counter blanks may be handled more expeditiously; to provide a manually operable loading device which is subject to control by the operator as distinguished from automatic molding apparatus in which the cycle of operation, once initiated, cannot be interrupted; to provide a loader which is adapted to take counters of different size and different lengths; to provide a loader in which there is means for adjusting the width of the body and the base flange, as may be desired; to provide a loader in which there is means for gauging the length of the wings and for moving the gauging means into and out of operative position to avoid damage to the counter; to provide a loader in which the angle at which the counter is presented to the male mold part may be adjusted according to the lower line of the counter; to provide a combination loader and molding apparatus in which the counter can be removed from the male part following molding with greater ease; and to provide a loading apparatus which is of simple design, adapted to be used in conjunction with existing molding apparatus without extensive redesign of the latter, and which is efficient and can be operated without employing skilled help.

As herein illustrated, the apparatus is designed to be used with male and female mold parts, wherein the mold parts are relatively movable into engagement to clamp and shape a counter therebetween. The loader is mounted for pivotal movement from a loading position forwardly of the front face of the male mold part up to the front face to present the counter blank to the male mold part in such a position that it lies across the male mold part with its wings extending downwardly along the sides and carries spaced pairs of fingers between which the wings of the counter may be inserted while it is in its loading position with the central part arched across the space between them, gauge means adjustable lengthwise of the fingers to control the length of the wings, and means operable as the mold parts are moved into engagement to displace the gauge means away from the ends of the wings, so that after the blank is clamped between the male and female mold parts the loader may be moved away from the male mold part without damage to the end portions of the counter. The fingers yieldingly engage the wings of the counter and the pairs comprise outer fingers which are adjustable widthwise according to the width of different molds and inner fingers pivotally movable toward and away from the outer fingers which are yieldingly urged in a direction toward the outer fingers to hold the wings in place. There is means for adjusting the angular disposition of the plane of the fingers with reference to the male mold part and means to adjust the spacing between the fingers and the mold when they are moved up to the mold part. The male mold part is pivotally supported at its lower end so that it may be tilted forwardly out from under the female mold part to facilitate removing the molded counter and there are operable connections between the loader and the male mold part by means of which the male mold part is tilted outwardly during the latter part of movement of the loader to loading position and to return the male mold part to its normal position during the early part of movement of the loader toward operative position.

The invention will now be described in greater detail with reference to the accompanying drawings wherein:

Fig. 1 is an elevation of the apparatus, at one side, showing in full lines the male mold part with the loader moved up to a position to dispose the counter over the male mold part and in dotted lines the male mold part tipped forwardly and the loader retracted;

Fig. 2 is an isometric view of the loader in its retracted position ready to receive a counter blank and showing a portion of the support for the lower end of its supporting arms and the lower part of the male mold situated therebetween;

Fig. 7 is a front elevation of the male mold and the loader with the latter elevated;

Figure 3:
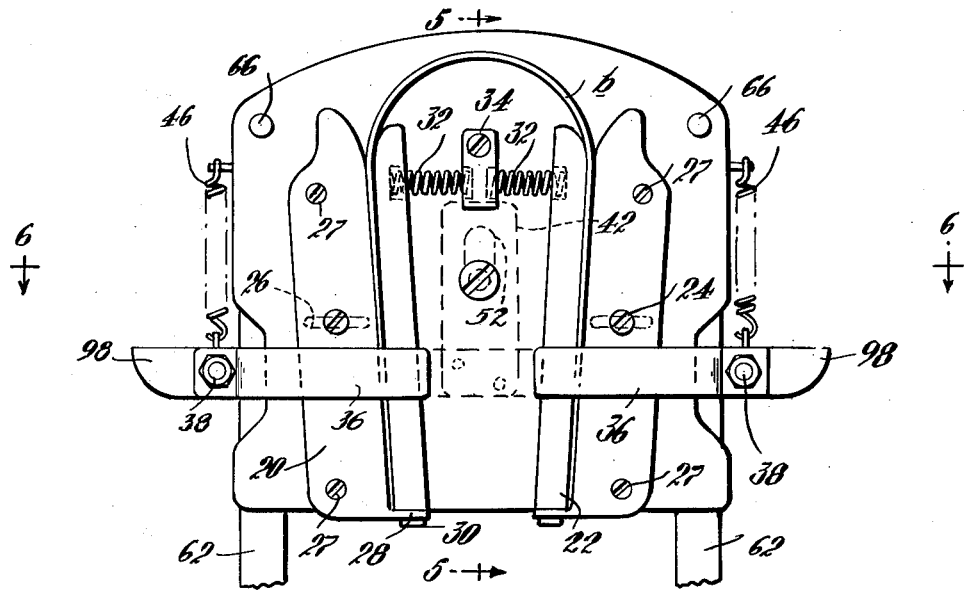
Fig. 3 is a plan view of the loader as seen from the front side.

Referring to the drawings, Fig. 1, there is shown a male mold part 10 which stands in an upright position on a post 12 beneath a female mold part 14, shown in dotted lines. As will appear hereinafter, the male mold part is supported for pivotal movement into and out of position beneath the female mold part and also for vertical movement into and out of engagement with the female mold part. The female mold part is movable downwardly, as indicated by the arrow, to close about a counter, which has been previously placed astride the upper end of the mold part 10 and thus conform the counter to the upper curved surface of the male part and its downwardly extending surfaces at opposite sides, so that the counter takes the shape of the back part of a shoe. In conjunction with the mold parts, there is a wiper 16 which moves downwardly along the forward face of the female mold part and across the male mold part after the counter has been engaged between the two, so as to form a flange at the foot of the counter. The foregoing parts are all conventional, as shown for example in Bailey, No. 2,185,937, and need not be further described herein for a complete understanding of the loader which forms the subject matter of this invention.

The loader itself, as shown in Fig. 2 in perspective, comprise a plate 18 on which there are mounted spaced pairs of fingers, each pair of fingers including an outer finger 20 and an inner finger 22 for engagement respectively with the outer and inner sides of the wings of the counter blank b, as shown in Fig. 3, in which figure the counter is shown disposed with its wing portion inserted between the fingers and its back part arched across the space between the fingers. The outer fingers 20—20 are secured to the plate 18 by screw bolts 24 arranged in slots 26 provided in the plate 18 so that they may be adjusted to and from each other to vary the distance between them for molds of different width. The lower end of each outer finger 20 has an inwardly extending flange 28 containing an opening into which there is loosely fitted a projection 30 on the lower end of the inner finger 22, so that the outer finger supports the inner finger at its lower end for limited movement to and from the outer finger. A pair of springs 32—32 are supported near the upper ends of the inner fingers by engagement of their adjacent ends with recesses in opposite sides of a block 34 fastened to the plate 18 between the fingers and their opposite ends with recesses in the inner sides of the inner fingers. The springs urge the inner fingers toward the outer fingers so as to clamp the wings of the counter between the pairs of fingers. Since the inner fingers are supported by the outer fingers, they are adjustable with the outer fingers. Set screws 27, at the ends of the outer fingers, when screwed up hard against the plate 18 fix the fingers in their adjusted position.

To provide for proper mounting of the counter blank so that, when it is raised into position to be applied to the male mold part, the arched end will slide over the end of the male mold part without interference and without a gap, gauge elements 36—36 (Fig. 3) are mounted on the loader so as to extend transversely of the fingers. The distance that the wings of the counter blank may be thrust between the fingers is accordingly limited by engagement of the ends of the blank with the gauge elements. The gauge elements 36—36 are fastened by bolts 38—38 to a horizontally disposed bar 40, which in turn is fastened to an end of a slide 42 mounted on the back of the plate 18 between spaced ways 44—44. The plate 18 has a hole through its center for receiving an attaching screw 50, the shank of which passes through a slot 52 in the slide 42 and is threaded into a base plate 54. Hence the bar 40 which is mounted on the slide and the guides which are mounted on the bar are free to move longitudinally with respect to the fingers. A pair of substantially completely contracted springs 46—46, one connected to each end of the bar 40 and to the plate 18, yieldingly hold the lower end of the slot 52 in the slide 42 engaged with the screw 50, thus holding the gauge elements against the lower extremities of the counter. The gauge elements 36—36 are angularly adjustable about the bolts 38—38 for counter wings of different length.

Figures 4, 5, 6:
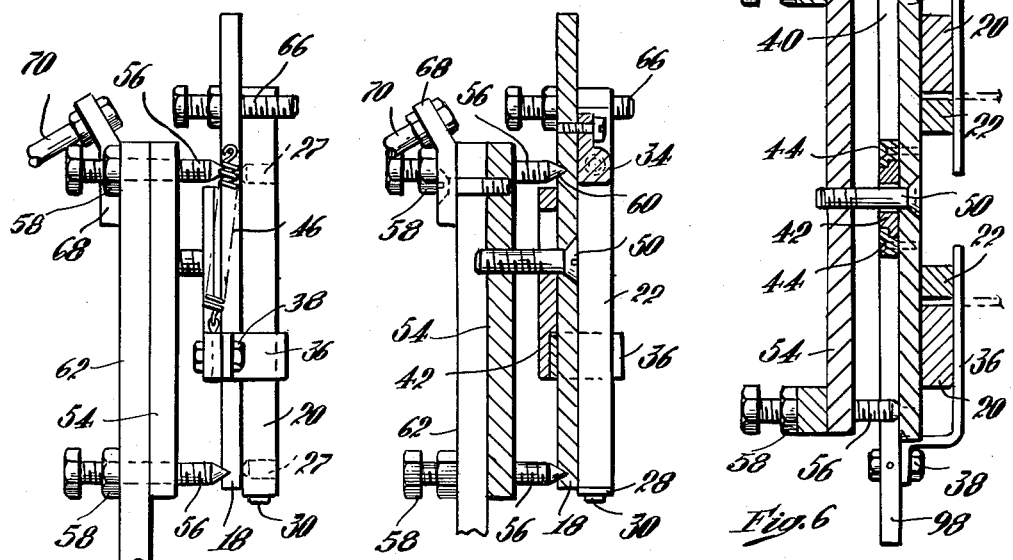
Fig. 4 is a side elevation of Fig. 3 as seen from the left-hand side thereof.
Fig. 5 is a section taken on the line 5—5 of Fig. 3.
Fig. 6 is a transverse section taken on the line 6—6 of Fig. 3.

The plate 18 is mounted on a base plate 54 by threaded engagement of the screw 50 therewith and is held in spaced relation thereto by four adjusting screws 56 which are threaded through it from its back side so that the ends of the screws bear upon the back side of the plate 18 (Fig. 5). By adjustment of the screws 56, the plane of the plate 18 may be positioned so as to be parallel to the base plate 54 or to be angularly disposed with reference to the base plate. This permits adjustment of the lower line of the counter relative to the mold. Lock nuts 58 are provided for fixing the adjusting screws after the plates 18 and 54 are properly positioned. The plate 18 has conical recesses 60 for receiving the ends of the adjusting screw 56 so that there can be no twisting of one plate relative to the other.

The back of the base plate 54 has fastened to it a pair of spaced arms 62—62 which extend forwardly and upwardly at an angle, as shown in Fig. 2, and have at their extremities holes for receiving pins 64 mounted at the upper ends of a pair of spaced posts 65—65, Fig. 7, bolted to the base of the machine so that the loader may be swung upwardly and forwardly about the axes of the pins from a substantially horizontal position, as shown in Fig. 2, to a position adjacent the front face of the male mold part 10, as shown in Figs. 1 and 7.

With a counter b mounted between the fingers, as shown in Fig. 3 and in dot and dash lines in Fig. 1, if the gauges 36—36 have been properly adjusted, the upper part of the counter will slide over the upper surface of the male mold part and its wings will extend downwardly along its opposite sides. For the purpose of varying the depth of the counter body and/or the width of the base flange that will be formed, a pair of screws 66—66 are threaded through the plate 18, near its outer end, for engagement of their ends with the face of the male mold part, as shown in Fig. 1. By adjusting the screws in the plate 18, the distance between the plate 18 and the face of the male mold part may be varied so that the part of the counter blank disposed across the male mold and the part remaining, which will constitute the flange, can be varied at will.

The base plate 54 has fastened to it by a suitable bracket 68 a handle 70, by means of which the loader may be manually moved from loading position to operative position at the will of the operator and independently of the operation of the mold parts or any cyclical motion of the molding apparatus.

The foot of the post 12 which carries the male mold part 10 is pivotally supported by a pin 72 (Figs. 1 and 7), between a pair of spaced ears 74—74 at the top of a member 76, so that it can tilt forwardly about the axis of pin 72 with respect to the female mold part to a position in which its upper surface is clear of the female mold part, as shown in dot and dash lines in Fig. 1, the reason for this being to facilitate removing the molded counter when it has been completed. Preferably, the tilting movement of the mold is accomplished by movement of the loader into and out of operative position and to this end there is fastened to the foot of the post 12 an arm 78 (Fig. 1), one end of which is bent upwardly at 80 against the front face of the foot and the other end of which has a flange 82 to which one end of a spring 84 is connected. The opposite end of the spring 84 is adjustably connected to a fixed part of the machine 86 so that normally the spring holds the arm 78 in horizontal position and hence holds the male mold part perpendicular. Arms 88—88 are pivotally mounted on the posts 65—65 on the pins 64 supporting the arms 62—62 and the rear end of these arms are adjustably connected to the arm 78 by a rod 90, one end of which is pivoted to the arm 78 and the opposite end of which is threaded and extends through the arms 88—88 and is secured thereto by nuts 92. The forward ends of the arms 88—88 have projections 94—94 arranged to underlie the arms 62—62 so that, during the latter part of the downward movement of the loader, the arms 62—62 engage the projection 94—94 so as to swing the arms 88—88 in a counterclockwise direction, as seen in Fig. 1, and thereby to tilt the arm 78 and hence the male mold part forwardly. When the loader is moved upwardly toward the loading position, disengagement of the arms 62—62 from the projections 94—94 allows the spring 84 to return the arms 88—88 and 78 to their normal position so that the male mold parts stands upright beneath the female mold part in readiness for receiving the counter as the loader reaches its operative position.

The member 76 and the posts 65—65 are fastened to a bed movable vertically, as shown in the Bailey patent, to raise the parts toward the female mold part.

Figure 8:
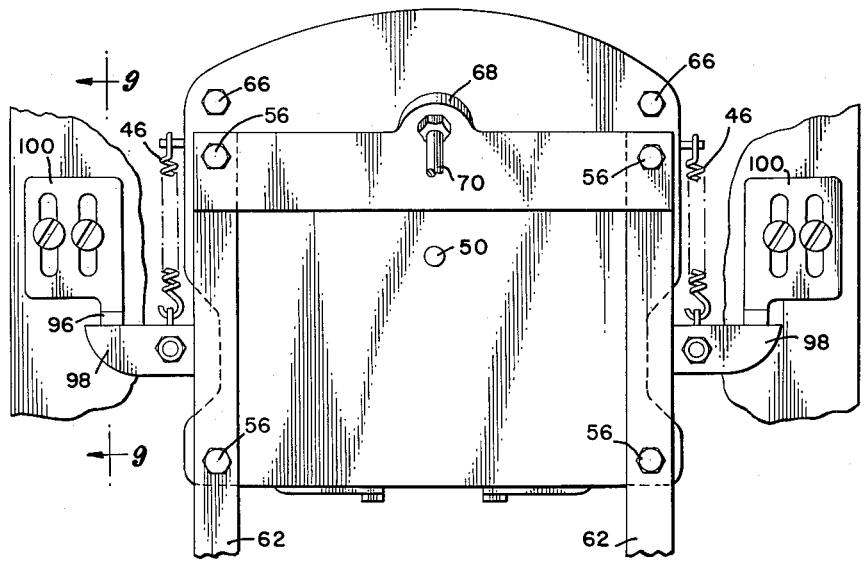
Fig. 8 is a rear view of Fig. 3, showing the release stops.
Figure 9:
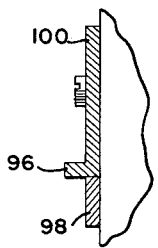
Fig. 9 is a section taken on the line 9—9 of Fig. 8.

After the loader is moved into its operative position and the male and female mold parts 10 and 14 engage the operator retracts the loader by simply pulling forwardly on the handle 70 so as to disengage the fingers from the lower edge of the counter. To prevent the gauge elements 36 from rubbing against the ends of the counter as they move rearwardly with the loader a pair of release stops 96—96 (Fig. 8) are mounted on the frame at opposite sides of the loader. Extensions 98—98 are provided at the ends of the bar 40 which will engage lower flanged ends of the stops as the loader and male mold part are moved up into position beneath the female mold part. Engagement of the extensions with the release stops displaces the gauge elements downwardly, thereby moving them away from the ends of the counter blank. This is permitted by the fact that the bar 40, as previously explained, is mounted on the slide which is yieldingly held in position against a limiting stop by the springs 46—46. The lower end of the release stops projecting outwardly from the face of the frame so that during the initial movement of the loader away from the mold, the gauge elements are held away from the ends of the wings and no damage is caused. The release stops 96—96 are carried by slotted bracket plates 100—100 so that they may be adjusted for different lengths of counter.

In operation or use of the loader the gauge elements 36—36 are adjusted so that when the ends of the counter are resting thereon the arch at the back of the counter will just slide over the end of the male mold member. Adjustments are also made in the spacing of the fingers 20—20 so that the distance between the wings will be correct. The loader is now moved down to the position shown in Fig. 3, in which it is substantially horizontal and the operator takes a flat counter, bends it to bring its wings toward each other and thrusts them between the pairs of fingers against the gauge elements. He then grasps the operating handle 70 and lifts the loader upwardly toward the front face of the male mold part. If the gauge elements 36—36 and the adjusting screws 66—66 have been properly positioned just the right amount of the upper part of the counter will be thrust over the upper end of the male mold part and just enough of the lower part of the counter will project forwardly from the front face of the male mold part to provide for a satisfactory flange at the base of the counter. The male and female mold parts 10 and 14 are now brought together by relative movement into clamping engagement with the counter whereupon the operator pulls the loader rearwardly to disengage the fingers from the lower edge of the counter. The wiper 16 is now lowered to form the flange. While the mold parts are engaged with the counter the loader may be moved away from the mold parts to disengage the fingers from the edge of the counter and to lower it to a position for placing another counter blank between the fingers in readiness for the next operation. As soon as the male and female mold parts are disengaged, however, further movement of the loader downwardly pulls the male mold part forwardly, carrying with it the molded counter so that the latter can be easily removed from the mold. The operator may now raise the loader with a counter on it to loading position which automatically restores the male mold part to its proper position with respect to the female mold part and dispose the counter astride the male mold in readiness for the next molding operation.

It should be understood that the present disclosure is for the purpose of illustration only and that this invention includes all modifications and equivalents which fall within the scope of the appended claims.

I claim:

1. In a counter molding machine having spaced male and female mold members movable into engagement to impart a shape to a counter blank placed therebetween corresponding to the back part of a shoe, a loader upon which the counter blank may be mounted and held in a shape to be placed astride the male mold, comprising a support mounting spaced pairs of fingers between which the wings of the counter blank may be inserted with the central portion arched across the space between the fingers, gauge means adjustable lengthwise of the fingers for engagement with the ends of the blank to control the position of the blank on the mount, means mounting the support for movement from a loading position up to the face of the male mold, and means adjacent the members operable, as the mold members are moved into engagement, to move the gauge means from the ends of the counter blank to permit retraction of the loader without damage to said ends of the counter.

2. Apparatus, according to claim 1, wherein the gauge means are angularly adjustable in the plane of the fingers.

3. In a counter molding machine having spaced male and female mold members movable into engagement to impart a shape to a counter blank placed therebetween corresponding to the back part of a shoe, a loader upon which the counter may be mounted and held in a shape to be presented to the mold members, comprising a support mounting spaced pairs of fingers, each pair comprising an outer finger for engagement with the outer side of a wing of the counter blank and an inner finger for engagement with the inner side of a wing of the counter blank, said fingers yieldingly engaging the wings and holding the blank bent with the midpart arched across the space between the pairs of fingers, means pivotally mounting gauge elements transversely of each pair of fingers for engagement with the ends of the blank to limit their position, springs operating on the gauge elements yieldingly to hold them in a predetermined position, means pivotally mounting the support for movement from a substantially horizontal loading position up to the face of the mold, and means cooperable with the gauge elements on the support as the molds are moved into engagement to move the gauge elements away from the ends of the wings and to hold them away from said ends until the support is retracted beyond said ends.

4. Apparatus, according to claim 2, wherein the spring means are normally substantially wholly contracted when the loader is in loading position.

5. In a counter molding machine having spaced male and female mold parts movable into engagement to impart a shape to a counter blank placed therebetween corresponding to the back part of a shoe, a loader upon which a counter may be placed and held in a position to be presented arcuate in shape to the male mold, comprising a support mounting spaced pairs of fingers, each pair comprising an outer finger for engagement with the outer side of the wing of the counter, and an inner finger for engagement with the inner side thereof, means adjustably securing the outer fingers to the support for changing the distance between them according to the style of the counter, means yieldingly urging the inner fingers toward the outer fingers, a pair of gauge elements, slide means mounting the gauge elements on the support for movement longitudinally with respect to the fingers, an abutment on the support for limiting movement of the slide in one direction but permitting its movement in the other direction, spring means operable on the slide to hold the slide engaged with the abutment, and means on the machine operable by engagement with the gauges on the support as the mold parts are moved into engagement to displace the gauge from the ends of the counter blank by sliding movement of the slide away from the abutment, said gauge elements being returned to their initial position after they have cleared the ends of the counter blank by the spring means returning the slide into engagement with the abutment.

6. In a counter molding machine having spaced male and female mold parts movable into engagement with a counter blank to impart a shape thereto corresponding to the back part of a shoe, a loader upon which the counter may be placed for movement of the counter up to the mold, comprising a support, a pair of spaced fingers between which the wings of the counter may be disposed with the part of the blank intermediate the fingers arched, means securing the fingers to the support for adjustment of the space therebetween, a second pair of fingers disposed substantially parallel to the first pair of fingers, means on the first finger with which the lower ends of said second fingers are engaged for pivotal movement of the second fingers at said ends toward the first fingers, spring means adjacent the other ends of the second fingers operating on them in directions to urge them toward the first fingers, to clamp the wings of the counter disposed therebetween, gauge means limiting the position of the lower ends of the counter disposed between the fingers and hence the height of the arch, means mounting the support for movement from a loading position up to the face of the male mold, and means operable by movement of the mold parts into engagement, following movement of the loader into loading position, to displace the gauge means from the lower ends of the counter and for holding them displaced as the loader is moved out of loading position.

7. In a counter molding machine having spaced male and female mold parts movable into engagement with a counter blank placed therebetween to impart a shape thereto corresponding to the back part of a shoe, a loader upon which a counter blank may be placed for presentation to the male mold, comprising a support, a pair of spaced fingers between which the wings of the counter blank may be disposed with the part intermediate the wings arched, means securing the fingers to the support for adjustment to and from each other to change the spacing therebetween, a second pair of fingers disposed substantially parallel to the first pair, means at the lower end of the fingers loosely interengaged so that the second pair of fingers are free to move to and from the first pair of fingers, spring means disposed on the support between the second pair of fingers near their upper ends, with its ends engaged therewith and yieldingly pressing the latter toward the first pair of fingers, yieldingly to clamp the leg of a counter blank between them, said pairs of fingers diverging at their upper ends to facilitate sliding the ends of the blank inwardly between the fingers, gauge means disposed transversely of the fingers and adjustable with reference to the diverging ends of the fingers to limit the distance that the wings can be pushed between the fingers, means mounting the support for movement from a loading position up to the face of the mold, and means adjacent the mold which is operable to move the gauge means into an out-of-the-way position as the molds are moved into engagement after the loader is moved up to the male mold, said last-named means being operable to hold the gauge means in said position until they are cleared of the ends of the counter during retraction of the loader.

8. In a counter molding machine having spaced male and female mold parts movable into engagement, means pivotally supporting the male part for angular movement forwardly with respect to the female part, a loader, means pivotally supporting the loader for movement from a loading position forwardly of the male mold part up to its front face, and means connecting the male part to the loader to tip the male part forwardly during the latter part of the movement of the loader forwardly to loading position and to tip the male part rearwardly during the early part of the movement of the loader rearwardly toward the loading position.

9. In a counter molding machine having spaced male and female mold parts movable into engagement, means pivotally supporting the male part for angular movement forwardly with respect to the female part, spring means associated therewith operable normally to hold the male mold part upright, a loader, means pivotally supporting the loader for movement from a loading position forwardly of the male mold part up to the mold, means movable with the loader operable during the latter part of the movement of the loader to loading position to tilt the male mold forwardly, said spring means being operable to restore the male mold member to its upright position as the loader is moved toward loading position, and an arm movable with the means pivotally supporting the male mold part operable in conjunction with the spring to restore the male mold part to its upright position.

10. In a counter molding machine having spaced male and female mold parts movable into engagement, an arm pivotally supporting the male mold part for tilting forwardly relative to the female part, spring means connected to the arm opposing such forward tilting movement, a loader, means pivotally supporting the loader for angular movement from a position spaced from the front face of the male mold part up to the face to present a counter carried thereby to the male mold part for shaping by the female mold part, a second arm pivotally mounted on the support for the loader and connected to the first arm, said second arm having an end portion lying in the path of movement of the loader as the latter is moved to and from the male mold part, said end portion being operable by the latter part of movement of the loader to loading position to tilt the first arm and hence the male mold part forwardly, and means on the first arm engaged with the male mold part operable to return the male mold part to its upright position as the arm is returned by the spring to its initial position.

References Cited in the file of this patent

UNITED STATES PATENTS

| | | |
|---|---|---|
| 1,517,695 | Ayer | Dec. 2, 1924 |
| 2,185,937 | Bailey | Jan. 2, 1940 |